HARRY STUART
INVENTOR
BY *Harry Stuart*

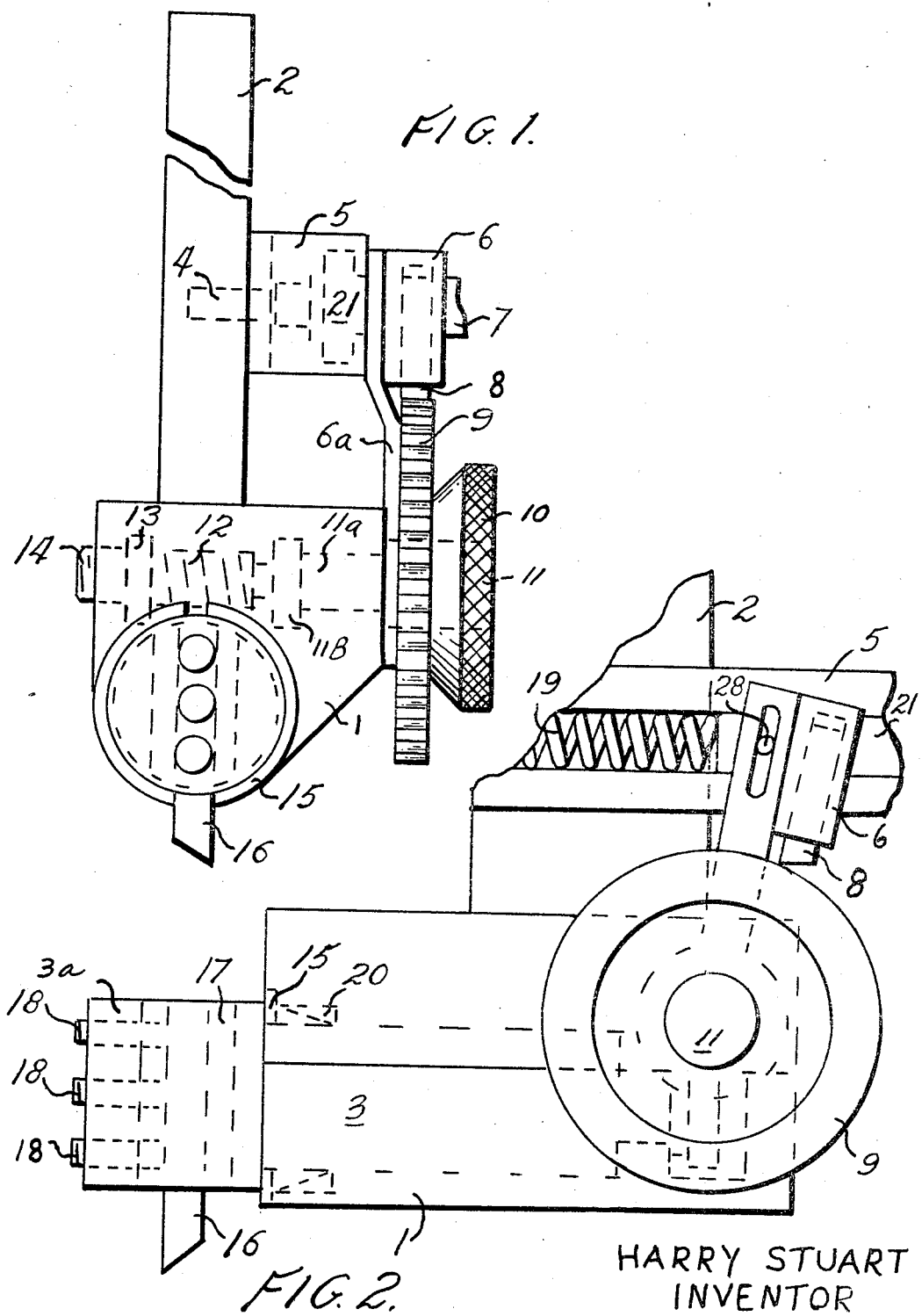

HARRY STUART
INVENTOR

BY Harry Stuart

United States Patent Office

3,279,322
Patented Oct. 18, 1966

3,279,322
RADIUS CUTTING TOOLS
Harry Stuart, 712 Washington Ave., West Haven, Conn.
Filed May 28, 1965, Ser. No. 459,871
7 Claims. (Cl. 90—52)

My invention relates to radius cutting tools operative by impact, and having predetermined measured geometrical progression movement, similarly defined as radian, and specifically directed at shapers, planers and other reciprocating metal-working machines in this same and similar category. It has particularly useful utility in the production and manufacture of curvatured dies, molds, and structures of this same and variable like requiring both single and multiple application of machining radii section.

In the above stated useful application of this radius cutting tool, it is frequently required to produce dimensional cavities in the die or mold having single or multiple specified section of radii over short and longitudinal distance, and on various planetary surfaces void of same relationship. Conventional radius cutting tools, such as those circular cutting tools designed for millers and the same, are mathematically limited to the diameter of the circular tool employed, and aside from the limitations of their diametrical bodies, circular radius cutting tools are incapable of machining radii on such surfaces broken by shoulders, rises, ribs, or other known configurations without having first to join two or more pieces of metal together to accomplish the finished product.

Secondly, another object of my invention is to provide a radius cutting tool operative by impact which can utilize ordinary tool-bits, commonly referred to as lathe tool-bits.

Thirdly, another object of my invention is to provide a radius cutting tool operative by impact, and having accurately governed measured movement capable of directing the aforementioned tool-bit against the work surface in such finely measured tolerances that are applicable of achieving variable profilometer machined finishes.

In the accompanying drawings, for the purpose of clear and concise illustration, is shown the construction and application of my invention.

Figure 3:
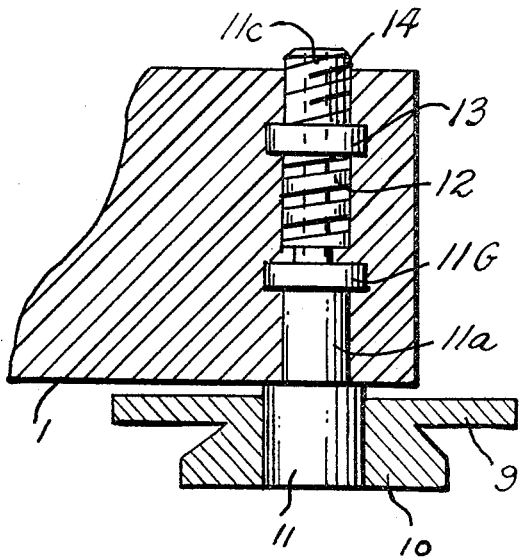
Figure 4:
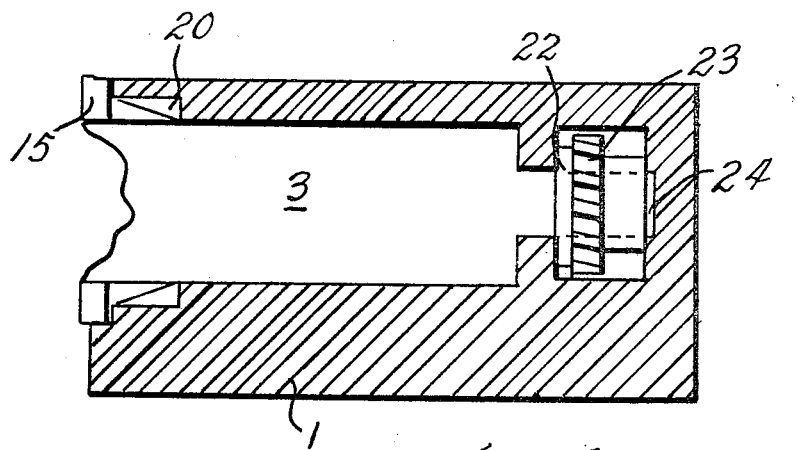
Figure 5:
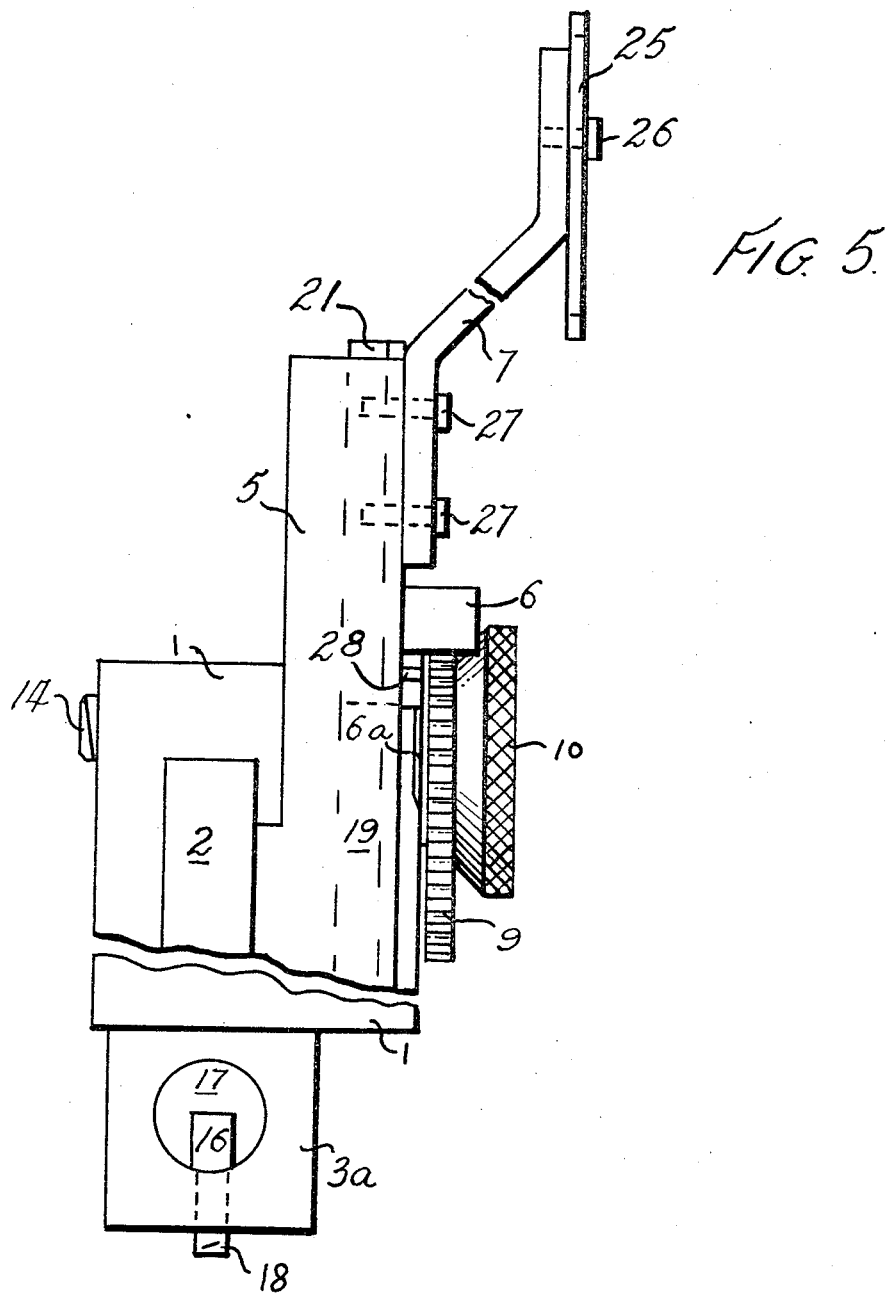
Figure 6:
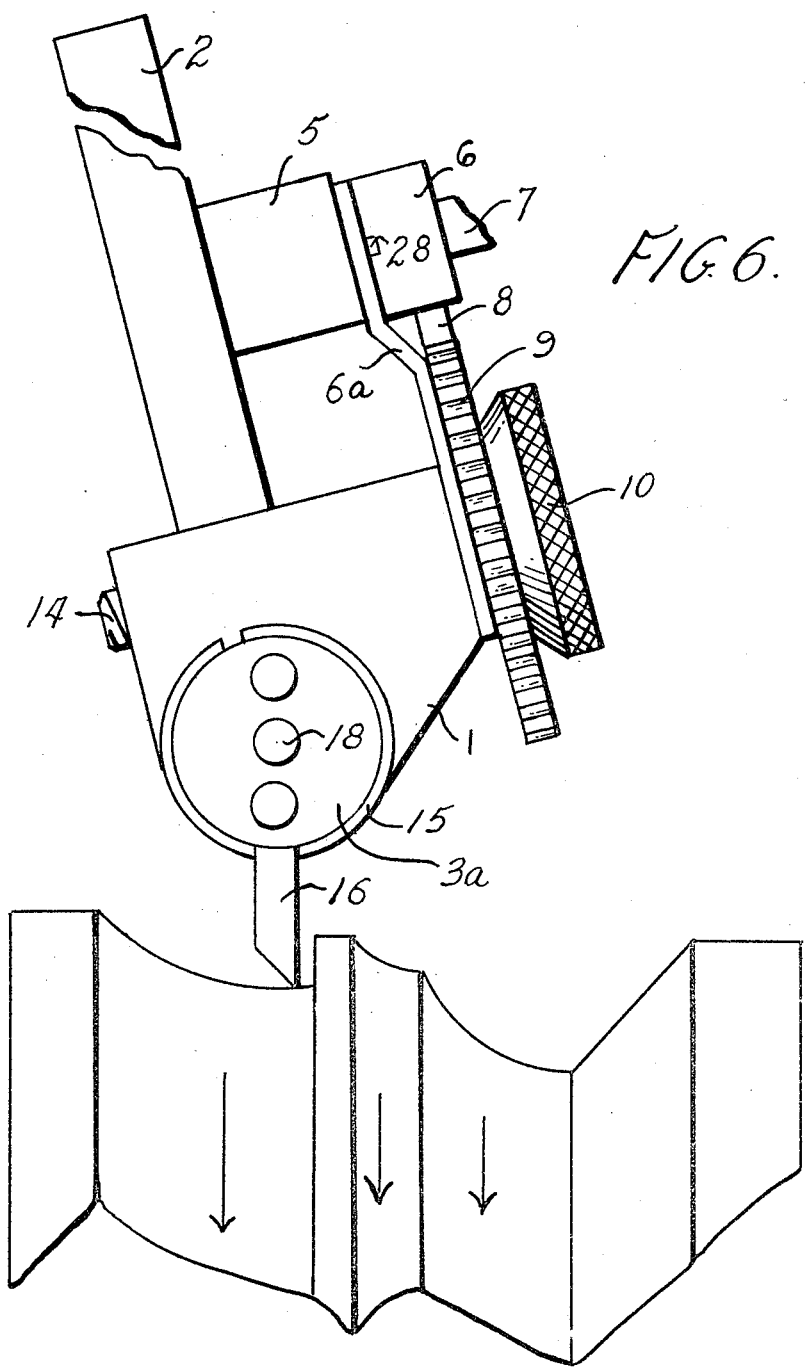

Drawing 1:
    FIGURE 1 is a forward view of my invention.
    FIGURE 2 is a side view of the same.
Drawing 2:
    FIGURE 3 is a cut-away view of the technical construction of the upper section of my invention.
    FIGURE 4 is a cut-away view of the technical construction of the lower section of my invention.
Drawing 3:
    FIGURE 5 is a downward view of my invention.
Drawing 4:
    FIGURE 6 is an illustrative application of my invention in impact position and at angular adjustment against the work piece.

Referring to Drawing 1, the numeral 1 designates the body. The numeral 2 designates the mounting post which is securely clamped into the head of the shaper or planer. Numeral 3 designates the arbor which has slide-fit within the body 1, splined at its after-end to accommodate the gear 23 and numeral 3a designates the head of the arbor which is made receptive to tooling. Numeral 4 is one of two socket-head screws holding the slide and ratchet movement to the mounting post 2. Numeral 5 is the main body of the slide. Numeral 6 houses a floating fine-edged key 8 which corresponds dimensionally to the required number of places on the ratchet wheel 9 and which is allowed to ride free and engage the ratchet wheel by gravitational force. 6 and 6a designate the key holding lever which operates in conjunction with the slide 21 by the guide pin 28 which rides freely in the slot, pushing the lever forward to activate the ratchet wheel 9. Numeral 19 is a light compressor spring which serves to return the slide 21 to cocking position following each forward movement. Numeral 10 is a hand-knob which serves a dual purpose of hand operation and manual traverse application of the arbor 3. Numeral 11 is a portion of the shaft to which is mounted 9 and 10, and which, being diametrically larger than 11a, serves to retain thrust, 11b is a thrust retaining collar and part of the shaft thereof. 11c is the extension of the shaft upon which is affixed a worm 12, a floating thrust collar 13 to oppose opposite thrust, and a socket screw 14, which also serves a dual purpose of holding the thrust collar 13 against the worm 12, or locking the entire mechanism for repetitive performance of the arbor 3. The numeral 17 is a tool-bit adaptor which may be broached in several sizes to accommodate a variety of standard tool-bits, i.e. one-quarter (¼), five sixteenths (5⁄16), and three-eighths (3⁄8). Numeral 16 designates the tool-bit clamped in the adaptor 17 by three set-screws 18, and extended downward in application.

Drawing 2 provides two cut-away views, upper and lower sections respectively, showing the precise arrangement and relationship of inner parts. The numerals of FIGURE 3 have been characterized in the foregoing. The numerals 15 and 20 in FIGURE 4 represent a combination of male and female tapered, split, spring-tempered, torsional clamp rings which encircle the arbor 3 and react under pressure of impact to contract and expand in conjunction with each other to form a locking action between the arbor 3 and the body 1. Numeral 22 is a space collar. Numeral 23 is a gear which is activated by the worm 12, and which, in conjunction with the ratchet wheel 9 imparts radian movement to the arbor 3 prior to impact. Numeral 24 is a recessed area for permitting arbor recoil.

Drawing 3 is a downward view of my invention showing in detail how the key 8 of drawing 1 is activated against the ratchet wheel 9. Numeral 7 is a stroker arm attached to the slide 21 by two socket screws 27, and bent to conform to mounting in the heads of most machines. Numeral 25 is an adjustable bumper which governs the number of teeth or places in the ratchet wheel 9 that may be turned per given stroke. Numeral 26 is a socket screw used to adjust and hold the bumper to the stroker arm 7.

Drawing 4 is an illustrative view of my invention in impact position and at slight angular adjustment against the work piece to clearly show the versatility and capability of this radius cutting tool to perform in areas foregoingly described.

The operation of my invention is as follows: My radius cutting tool is applicable to all metal cutting machines such as shapers, planers and other reciprocating machines where relative motion is employed between the cutting tool-bit and the work table carrying the work piece. The shapers in which the work table is stationary and the element holding the tool-bit has the reciprocating motion, or the planers in which the element holding the tool-bit is stationary and the work table has the reciprocating motion.

In the application of my device the first step, following roughing operations, similarly expressed as gouging or hogging operations, is to secure the mounting post 2 to the tool holding element of the machine, then the tool-bit 16 is adjusted within the tool-bit adaptor 17 corresponding to the required value of the radius to be acted upon, and measured from the vertex of the arbor 3a, and locked securely in place by the three set-screws 18. Both fractional and decimal dimensions of determined radius cutting operations may be obtained by any of the known methods employed by machinists or toolmakers in setting-up procedures such as subscribing to scale rule, the use of micrometers, or by gauge blocks. Succeeding the setting of the tool-bit to the required radius, the knurled hand-knob 10 allows rapid traverse of the entire arbor 3 and 3a, holding the tool-bit 16 to the desired starting position. Then, if operating on a shaper, the adjustable bumper 7 is set to conform both to the backward throw of the shaper and the number of places on the ratchet wheel 9 which govern the selected settings of the entire arbor 3 and 3a, including the tool-bit 16 against the work. i.e., by means measured radian movement, two minutes and forty-two seconds (2' 42") of one (1) degree, the decimal equivalent thereof, seven and eight-hundredths and one-half tenths of one thousandth (0.000785) multiplied by the number of places on the ratchet wheel 9 desired in order to obtain fine medium and coarse feed. If operating on a planer, with or without hydraulic head lift, a protuding object, similarly referred to as a rider, is positioned on the work table directly behind the head holding the radius cutting tool, and the adjustable bumper 7 is set to react against the rider in the same sequence relative to shapers. Following the above set-up procedures the machine is started and the radius cutting operations are performed with automatic progression of radian movement of tool-bit settings against the work piece prelude to each reciprocating motion of the machine.

The tool-bit 16, encountering resistance at the moment of impact against the work piece, forces the entire arbor 3 and 3a to backslide a few thousandths of an inch in a recoil action which allows for the head of the arbor 3a to transmit pressure against the set of tapered, split, torsional clamp rings 15 and 20, which, when acted upon together and in conjunction with one another, allow for both contraction and expansion to bind the arbor against twisting, turning and deflection. As the tool-bit 16 emerges from the work piece at the end of the machine's stroke, the entire arbor 3 and 3a are set free by the contrary action of the clamp rings 15 and 20 acted upon by the release of resistance. The gear 23 and the worm 12 also serve to interlock the entire arbor during cutting resistance, and coxial thrust on the worm 12 is controlled by the thrust collars 11, 11b and 13, thereby securing the gear worm and arbor against twisting, turning and deflection.

Engaging the said radius cutting tool as foregoingly described in work areas where radii section is broken off by acute rises, ribs or other configurations in the work piece, or where various radius values intercede, overlap, or otherwise terminate, the machine is simply stopped, or the tool bit 16 is otherwise adjusted to the new value with settings in accordance with the work piece.

The applicant highly-skilled and well educated in mechanical science, is well aware of the limitations of circular-edged tools to perform radius cutting operations, and is also familiar with the many forms of radius cutting tools apart from this which are employed in those areas where tool and work piece are constantly engaged, and in this instance does not offer any argument to same. However, radius cutting tools having geometrical progression movement and operative by impact constitute the subject-matter of this application, and it is understood that the form of my invention herein described and illustrated is only an example of the same, whereas larger and heavier models than that described here may depart from the same ratios of movement and limitations of structure without departing from the spirit of my invention or the scope of the subjoined claims.

I claim:

1. An impact radius cutting tool for shapers, planers and other reciprocating machines of this same and variable like, comprising a body and a mounting post, an arbor which is freely positioned into the above body and encircled by a pair of split, tapered, spring clamp torsion rings that react to the forces of resistance applied against the said arbor at moment of impact and hold the said arbor secure against torsional strain until lack of resistance frees the said arbor, the said arbor made adaptable at its forward end for carrying a tool-bit in a broached adaptor and splined at its after-end to slide-fit a gear, said gear being positioned within the diametrical dimensions of its own bore and made acceptable to recoil from the said arbor and relieve thrust upon said gear, the said gear also responsible for transmitting a given measured movement of geometrical progression to the said arbor when acted upon by a worm, said worm being coaxially secured to the said gear and which transmits a lead reduction of measured geometrical progression movement to the said gear prelude to impact, and held securely positioned against the coaxial thrust of recoil action put upon the said arbor and said gear at moment of impact by a shaft to which the said worm is affixed and by the diametrical dimension of its own bore, the said shaft axially secured to said worm, having both left and right thrust collars to control coaxial thrust, a ratchet wheel having a mathematically fixed and required number of places to predetermine a sub-division of measured geometrical progression movement transmitted to the said arbor, a key-type slide, spring loaded at its frontal end to effect cocking of a stroker at the prelude to impact, a ratchet key positioned above the said ratchet wheel and allowed to ride free and engage the said ratchet wheel by gravitional force, and activating the said ratchet wheel by the said key-type slide, an extended stroker arm with adjustable bumper attached which conveys responsible action to the said slide, key, ratcheted, worm, gear, arbor and tool-bit.

2. An impact radius cutting tool for shapers, planers and other reciprocating machines of this same and variable like, comprising the descriptive elements of claim 1, the said arbor receiving applied geometrical progression movement about the vertex of its axis prelude to impact as computed by divisional and sub-divisional geometrical movement as measured and transmitted to the said arbor by a fixed and required number of places on the said ratchet wheel which acts in conjunction with the predetermined lead of the said worm and gear.

3. An impact radius cutting tool for shapers, planers and other reciprocating machines of this same and variable like, comprising the descriptive elements of claim 1, the said ratchet wheel, in conjunction with the head of the said worm and gear, transmitting measured geometrical progression movement to the said arbor prelude to impact, the said tool-bit held by the said arbor and directing the said tool-bit against the work piece in predetermined settings measured in thousandths of one inch.

4. An impact radius cutting tool for shapers, planers and other reciprocating machines of this same and variable like, comprising the descriptive elements of claim 1, being capable of machining radii section in single and multiple application and on planes void of same relationship.

5. An impact radius cutting tool for shapers, planers and other reciprocating machines of this same and variable like, comprising the descriptive elements of claim 1, being capable of machining radii section in measured geometrical progression movements of degrees, minutes and seconds, and upon such surfaces that are broken by shoulders, rises, ribs and other known configurations.

6. An impact radius cutting tool for shapers, planers and other reciprocating machines of this same and variable like, comprising the descriptive elements of claim 1, of which the trigonometrical functions of angular measurement in relation to settings of the tool-bit to the work piece as computed by the measured geometrical progression movement of the arbor, and which may also be heretowith defined in the mathematical laws of geometrical measure as radians, whereas the arc, radius or circle may be divided into a many parts as there are radians in an angle at the vertex of said circle, and of which the mean radian setting of the tool-bit of the radius cutting tool of claim 1 is equivalent in degrees to two minutes and forty-two seconds (2′ 42″), or similarly expressed in radian decimal of seven and eight-hundredths and one-half tenths of one thousandth (0.000785).

7. An impact radius cutting tool for shapers, planers and other reciprocating machines of this same and variable like, comprising the descriptive elements of claim 1, and being adaptable to and having interchangeability from shaper to planer, or planer to shaper, and other reciprocating machines of this same and variable like.

No references cited.

WILLIAM W. DYER, JR., *Primary Examiner.*

G. A. DOST, *Assistant Examiner.*